US008433785B2

(12) United States Patent
Awadallah et al.

(10) Patent No.: US 8,433,785 B2
(45) Date of Patent: Apr. 30, 2013

(54) SYSTEM AND METHOD FOR DETECTING INTERNET BOTS (75) Inventors: Amr Awadallah, Palo Alto, CA (US); Sajjit Thampy, Sunnyvale, CA (US); Daniel Ferrante, Redwood City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 415 days.

(21) Appl. No.: 12/211,606

(22) Filed: Sep. 16, 2008

(65) Prior Publication Data
US 2010/0070620 A1   Mar. 18, 2010

(51) Int. Cl.
*G06F 15/173* (2006.01)

(52) U.S. Cl.
USPC ......................................................... 709/224

(58) Field of Classification Search .................... 709/224
See application file for complete search history.

(56) References Cited

U.S. PATENT DOCUMENTS

| 7,139,916 | B2 | 11/2006 | Billingsley et al. | |
|---|---|---|---|---|
| 7,260,837 | B2 | 8/2007 | Abraham et al. | |
| 7,516,220 | B1 * | 4/2009 | Stiert ............................ | 709/225 |
| 2002/0169865 | A1 | 11/2002 | Tarnoff | |
| 2004/0015554 | A1 * | 1/2004 | Wilson .......................... | 709/206 |
| 2004/0034801 | A1 * | 2/2004 | Jaeger ........................... | 713/202 |
| 2006/0136294 | A1 | 6/2006 | Linden et al. | |
| 2007/0094355 | A1 * | 4/2007 | Mulakala et al. ............. | 709/219 |
| 2007/0255821 | A1 | 11/2007 | Ge et al. | |
| 2007/0266305 | A1 | 11/2007 | Cong | |
| 2008/0109553 | A1 | 5/2008 | Fowler | |
| 2008/0183745 | A1 | 7/2008 | Cancel | |
| 2008/0301808 | A1 * | 12/2008 | Calo et al. ....................... | 726/23 |
| 2009/0094311 | A1 | 4/2009 | Awadallah et al. | |
| 2011/0191820 | A1 * | 8/2011 | Ivey ................................. | 726/3 |

OTHER PUBLICATIONS

Office Action dated Sep. 4, 2009 in U.S. Appl. No. 11/867,096, 13 pages.
Park et al., Securing Web Service by Automatic Robot Detection, http://www.cs.princeton.edu/~kyoungso/papers/robot-usenix.pdf, 2006.
Pusara et al., User Re-Authentication via Mouse Movements, VizSEC/DMSEC'04, Washington, DC, USA, Oct. 29, 2004.
Shivani Hashia, Authentication by Mouse Movements, San Jose State University, Dec. 2004.
Office Action for U.S. Appl. No. 11/867,096, dated Apr. 1, 2010.

\* cited by examiner

*Primary Examiner* — Brian P Whipple
(74) *Attorney, Agent, or Firm* — SNR Denton US LLP (57) ABSTRACT

Apparatuses, methods, and systems directed to detect Internet bots in communication networks. Some embodiments of the present invention allow an agent of a server to periodically record interaction events on a client system. The recorded interaction events are sent to a server and validated by a statistical test. Some embodiments of the present invention may be used to detect bots using server logs. In other embodiments, an agent of a server is able to detect and validate interaction events on a client system and the server periodically polls the agent to determine whether bots are detected on the client system.

17 Claims, 6 Drawing Sheets

SYSTEM AND METHOD FOR DETECTING INTERNET BOTS

TECHNICAL FIELD

The present disclosure relates to detecting Internet bots in network communications.

BACKGROUND

Internet bots are software applications that perform automated tasks over the Internet. They are also known as web robots or bots and have been used in a variety of Internet applications. Web crawlers use bots to automatically fetch and index web pages from various web sites so that search engines can perform queries on the indexed web pages. Bots have been used in online auction sites to discover bargains. In online gaming sites, bots have been used where a response speed faster than that of a human is desirable. In instant messenger applications, bots have been used to answer routine questions such as questions related to weather conditions, sporting event scores, and currency conversions.

Bots, however, may be used for malicious purposes. Bots have been used in automated operations to attack networked computers. For example, in a "denial of service" attack, a large number of bots, which may be geographically distributed, may saturate the target server with external communication requests so that the target server cannot respond to legitimate requests. Bots may also be used to influence ranking of search engine results. Search engines may use click data on search results to improve search results ranking. Bots may be used to repeatedly access certain search results from a large number of web sites to influence the ranking of the accessed search results.

Malicious bots may also be created in order to repeatedly access advertising-supported links to intentionally create the false appearance of many web site visits by human viewers. Advertising-supported links are generally short segments of text that are linked to an advertiser's web site. When a human viewer clicks on an advertising-supported link, the viewer "clicks through" the text link to visit the advertiser's web site. Many advertising-supported web sites have offered to sell advertising on a pay-per-click basis wherein the advertising-supported web site is only paid when a viewer "clicks through" on an advertising-supported link. When malicious bots are used to repeatedly click on advertising-supported links on a web site, web site advertisers are erroneously charged. Such attempts to create fictitious clicks on advertising-supported links are known as "click fraud".

In these and other contexts, a key factor to combat malicious bots is the ability to detect whether a communication request to a web site comes from an Internet bot or a human viewer. However, since a large number of requests from bots may not be malicious, and the volume of communication requests to a web site may be extremely high, it is a challenging task to find a scalable method to detect malicious bots.

SUMMARY

The present invention provides apparatuses, methods, and systems directed to detecting Internet bots in network communication. Some embodiments of the present invention allow an agent of a server to periodically record interaction events generated by interactions with an input device attached to a client system; the agent sends the recorded interaction events to the server to validate that the interaction events are a result of human interaction with the input device attached to the client system. Some embodiments of the present invention may be used to detect bots using server logs. In other embodiments, an agent of a server is able to detect and validate interaction events on a client system and the server periodically polls the agent to determine whether bots are detected on the client system.

In one embodiment of the present invention, the apparatuses and methods are directed to validating interaction events recorded on a client system by an agent, wherein the agent is operative within an executable environment of the client system. The agent collects data associated with the detected interaction events and sends the collected data to the server. In some embodiments, the agent sends an HTTP request to the server, wherein the collected data is encoded in the parameters of the HTTP request.

In other embodiments of the present invention, the apparatuses, methods, and systems involve processing data, which may be embodied in a server log, to identify and validate interaction events. In some embodiments, one or more IP addresses and user sessions are identified from the server log and interaction events are identified for each IP address and each user session.

In some other embodiments of the present invention, a server sends an agent to a client system to detect interaction events on the client system. The agent is able to detect and validate interaction events on the client system. The server periodically polls the agent to determine whether bots are detected on the client system.

The following detailed description together with the accompanying drawings will provide a better understanding of the nature and advantages of various embodiments of the present invention.

DESCRIPTION OF EXAMPLE EMBODIMENT(S)

The following example embodiments and their aspects are described and illustrated in conjunction with apparatuses, methods, and systems which are meant to be illustrative examples, not limiting in scope.

A. Network Implementation

Figure 1:
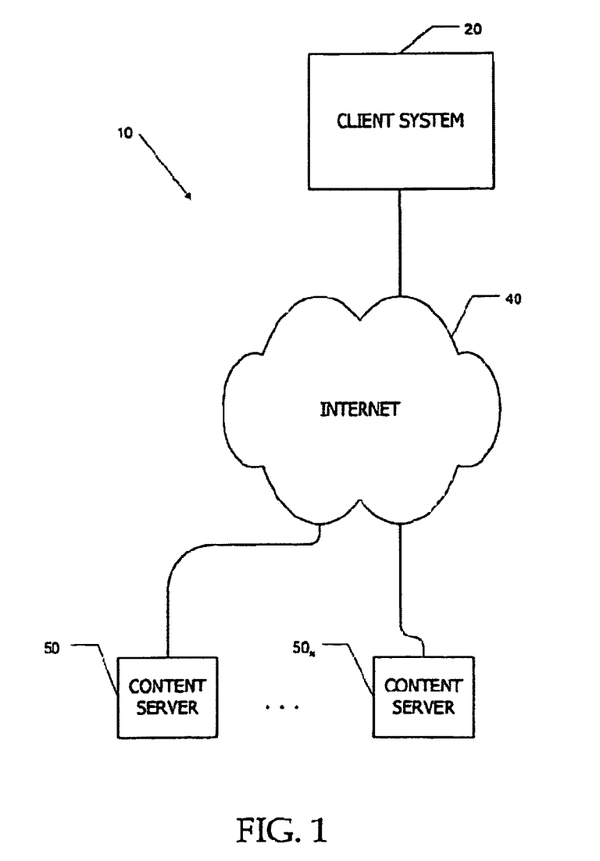
FIG. 1 is a diagram showing an example communication network, which network may be used with an embodiment of the present invention.

FIG. 1 illustrates a general overview of a communication network 10 including a client system 20 according to one particular embodiment of the present invention. In computer network 10, client system 20 is coupled through the Internet 40, or other communication network, e.g., over any local area network (LAN) or wide area network (WAN) connection, to any number of content servers $50_1$ to $50_N$. As will be described herein, client system 20 is configured according to the present invention to communicate with any of servers $50_1$ to $50_N$, e.g., to access, receive, retrieve and/or display web pages, text or graphical advertisements, and other information such as audio or video media content.

As FIG. 1 illustrates, particular embodiments may operate in a network environment including a plurality of hosts and other distributed systems. For example, client system 20 could include a desktop personal computer, workstation, laptop, personal digital assistant (PDA), cell phone, or any WAP (Wireless Application Protocol)-enabled device or any other computing device capable of interfacing directly or indirectly to the Internet. Client system 20 typically runs a browsing program, such as Microsoft's Internet Explorer™ browser, Netscape Navigator™ browser, Mozilla Firefox™ browser, Opera™ browser, or a WAP-enabled browser in the case of a cell phone, PDA or other wireless device, or the like, allowing a user of client system 20 to process and view information and web pages available to it from content servers $50_1$ to $50_N$ over Internet 40.

Client system 20 also typically includes one or more user interface devices that are usually manipulated or controlled by a human, such as a keyboard, a mouse, touch screen, pen or the like, for interacting with a graphical user interface (GUI) provided by the browser on a display (e.g., monitor screen, LCD display, etc.), in conjunction with pages, forms and other information provided by servers $50_1$ to $50_N$ or other servers. Sometimes, however, a bot may simulate human interaction with the user interface devices to defeat bot detection techniques such as those described in U.S. patent application Ser. No 11/867,096. The present invention is suitable for use with the Internet, which refers to a specific global network of networks. However, it should be understood that other networks can be used instead of or in addition to the Internet, such as an intranet, an extranet a virtual private network (VPN), a non-TCP/IP based network, any LAN or WAN or the like.

According to one embodiment, client system 20 and all of its components are configurable and made operative using an application including computer code run using a central processing unit such as an Intel x86-compatible microprocessor, an AMD x86-compatible microprocessor, or the like or multiple microprocessors. Computer code for configuring and operating client system 20 to communicate, process and display data and media content as described herein is preferably downloaded and/or stored on a hard disk, but the entire program code, or portions thereof, may also be stored in any other volatile or non-volatile memory medium or device such as a ROM or RAM, or provided on any media capable of storing program code, such as a compact disk (CD) medium, a digital video disk (DVD) medium, a floppy disk, and the like. Additionally, the entire program code, or portions thereof, may be transmitted and downloaded from a software source, e.g., from one of content servers $50_1$ to $50_N$ to client system 20 over the Internet, or transmitted over any other network connection (e.g., extranet VPN, LAN, or other conventional networks) using any communication medium and protocol (e.g., TCP/IP, HTTP, HTTPS, Ethernet, or other conventional media and protocol).

It should be appreciated that computer code for implementing embodiments of the present invention can be C, C++, HTML, XML, Java, etc., or any suitable scripting language, e.g., VBScript, JavaScript, or any other suitable programming language that can be executed on client system 20 or compiled to execute on client system 20. In some embodiments, needed code is embedded in a web page and sent to client system 20 and executed, or code already present at client system 20 is executed.

B. Client System

Figure 2:
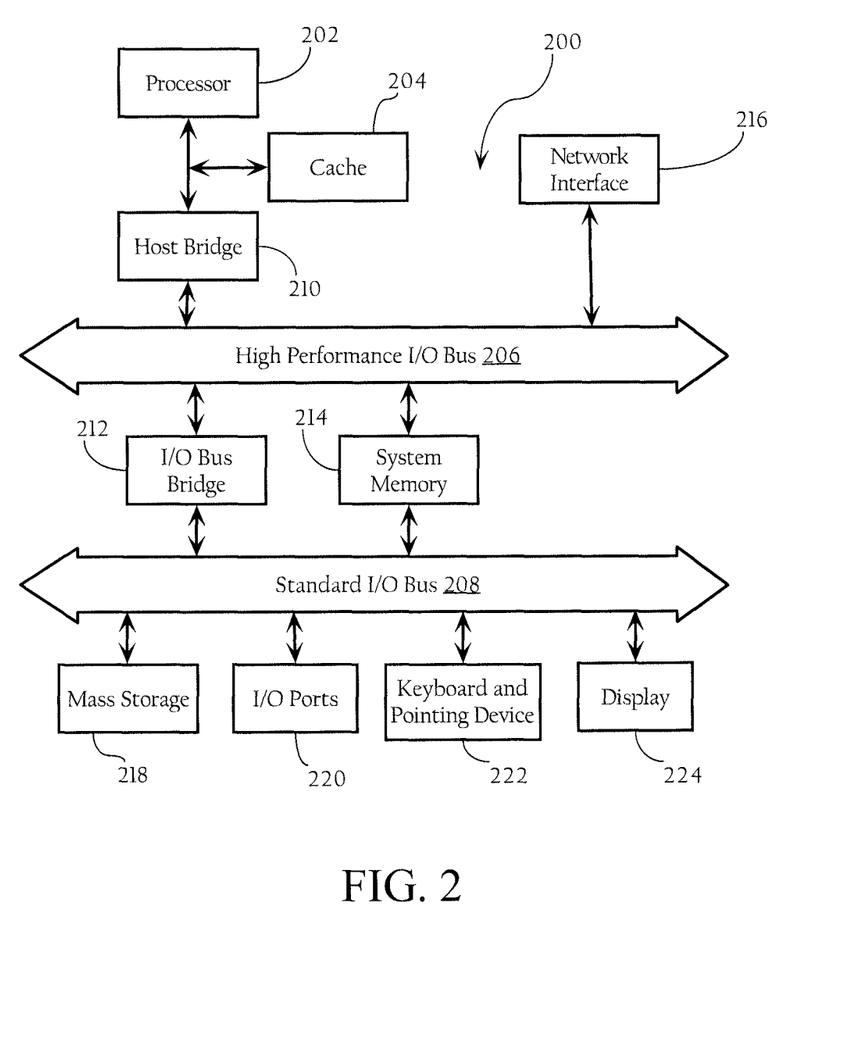
FIG. 2 is a diagram showing an example system architecture for a client system or a server, which may be used by an embodiment of the present invention.

FIG. 2 illustrates, for didactic purposes, a hardware system 200, which may be used to implement a client system or a server. In one embodiment, hardware system 200 comprises a processor 202, a cache memory 204, and one or more software applications and drivers directed to the functions described herein. Additionally, hardware system 200 includes a high performance input (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. In one embodiment, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, I/O devices, or memories.

In one embodiment, the detection processes described herein are implemented as a series of software routines run by hardware system 200. These software routines comprise a plurality or series of instructions to be executed by a processor in a hardware system, such as processor 202. Initially, the series of instructions may be stored on a storage device, such as mass storage 218, and/or downloaded from a remote host. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP/Vista operating system, available from Microsoft Corporation of Redmond, Wash., the Apple Macintosh Operating System, available from Apple Computer Inc. of Cupertino, Calif., UNIX operating systems, and the like.

One of the I/O devices may be a computer mouse or other pointer device connected to an interface, such as a serial port or a Universal Serial Bus (USB) port. When the computer mouse is moved, it generally transmits data characterizing the movement to the interface, which typically issues an interrupt. Some computer mice stream data packets that include information characterizing the state of the buttons and movement of the mouse in the x- and y-directions. A mouse driver handles the interrupt, processes the data, and updates internal values that show the mouse position on the display screen. In addition, the operating system implemented on the computing system architecture typically supports facilities that allow application programs or objects to register as listeners to mouse-related events, such as mouse movements and clicks. When an event is generated, the mouse event data is returned to event handlers registered as listeners.

C. Detection of Internet Bots

Figure 3:
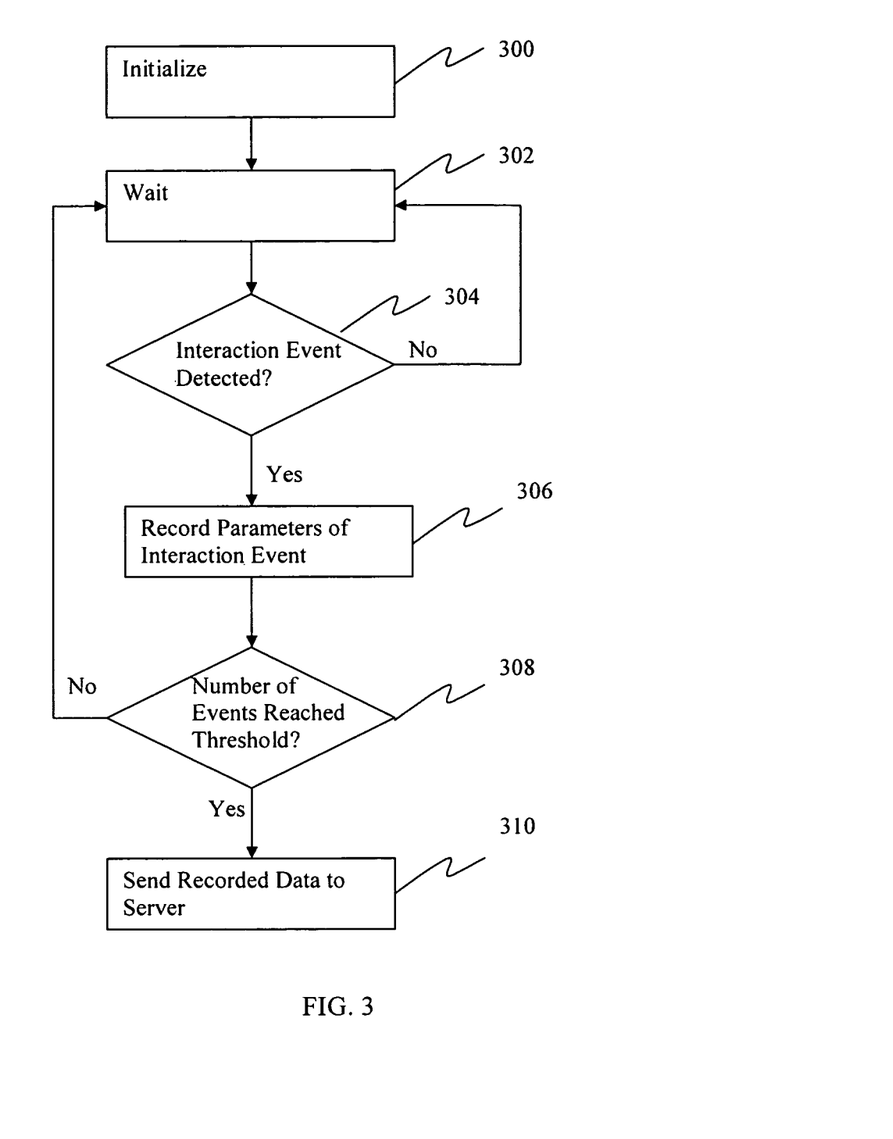
FIG. 3 is a diagram showing a flowchart of the example process used for detecting and recording one or more interaction events on a client system.

FIG. 3 illustrates an example process used for detecting and recording interaction events on a host. In the first step 300, an agent on the host is initialized. In some embodiments, initialization comprises activating an agent downloaded to a client system from a server. For example, the agent may comprise a script or other executable code object that is transmitted in connection with a web page to a browser client. For example, the web page may include a the script or code object, or include a call or request to the script or code object. The web page may further include one or more advertisements, such as sponsored hypertext links or banner ads, that a user may click on. When the user clicks on the advertisement, the browser may transmit a request for an advertisement to the server. In many pay-per-click models, activation of the sponsored ad creates a monitization event. As discussed in more detail below, the data gathered by the agent may be used to validate that the event is associated with an actual human being as opposed to an Internet bot executing on a remote host.

The agent may be a program written in a variety of programming or scripting languages such as C, C++, Java, Visual Basic, Perl, PHP, JavaScript, or ActionScript of Macromedia Flash. The agent may be running as a background process on the client system. For example, the agent may be running as a daemon on a UNIX or a Mac OS X system, or as a service on a Windows system. In some embodiments, the agent may be downloaded from the server and operate within the context of a user agent, such as a browser client. For example, the agent may comprise Javascript code embedded in a web page and executable within the context of the user agent that monitors interaction events with one or more input devices attached to the client system. In other embodiments, the agent may be a Java Applet or program that operates in connection with a Java Virtual Machine, which itself can be a plug-in to a user agent, such as a browser client.

The initialization step 300 is typically triggered when one of the running applications on the client system gets focus. The focus indicates the component of the graphical user interface which is currently selected to receive input. Text entered at the keyboard or pasted from a clipboard is sent to the component which currently has the focus. Focus may be moved to an application through a mouse click or by pressing a keyboard combination such as the combination of the ALT and the TAB keys. Typically, an embodiment of the present invention is initialized on at least one running application on the client system. For example, there may be multiple Internet browser applications running on the client system. An embodiment of the present invention may be a JavaScript program embedded in a web page and executed when a browser application gets focus. An embodiment of the present invention may also be a Macromedia Flash component such as an ActionScript which may execute when a browser application gets focus.

Upon initialization, the agent registers as a listener for mouse movement or other interaction events. After initialization, the agent waits for a period of time in step 302 before it checks for any interaction events in step 304. In some embodiments, the waiting period in step 302 is a fixed time interval such as 128 milliseconds or 256 milliseconds. In other embodiments, the waiting period may be a randomly chosen time interval.

In step 304, the agent checks for interaction events. In some embodiments, interaction with an input device attached to a client system results in data being accumulated in a buffer, which is then processed by the operating system. Application programming interfaces allow the agent to register as a subscriber or consumer of the interaction events passed to the browser or other user application. For example, the agent may register as a subscriber to the packetized data stream transmitted by a mouse that characterizes its movements and button state. In other implementations, the agent registers as a listener for interaction events using application programming interfaces provided by the operating system that provide interaction event data, such as the screen coordinates of the mouse. The agent periodically wakes up and waits for subscribed events such as a mouse movement notification event passed to it. If the agent receives any subscribed events while it is in step 304 checking for interaction events, the agent records the event data such as the last mouse coordinates or the last key stroke. If there are no subscribed events passed to the agent while the agent is awake, the agent goes to sleep and waits for another time period in step 302 before waking up again to check for interaction events.

If the agent detects an interaction event in step 304, the agent records one or more parameters of the interaction event in step 306. In some embodiments, coordinates of mouse pointers on a display screen may be recorded. In other embodiments, letters or symbols entered on a keyboard, a touch screen, a pen input device, or a speech recognition device may be recorded. In some other embodiments, types of motion such as a swipe or a shaking motion, directions of motion, and length or magnitude of motion may be recorded. In some embodiments, the parameters of the interaction event may be recorded in a cache file controlled by the agent. In other embodiments, the parameters may be recorded in an in-memory buffer controlled by the agent.

Figure 4:
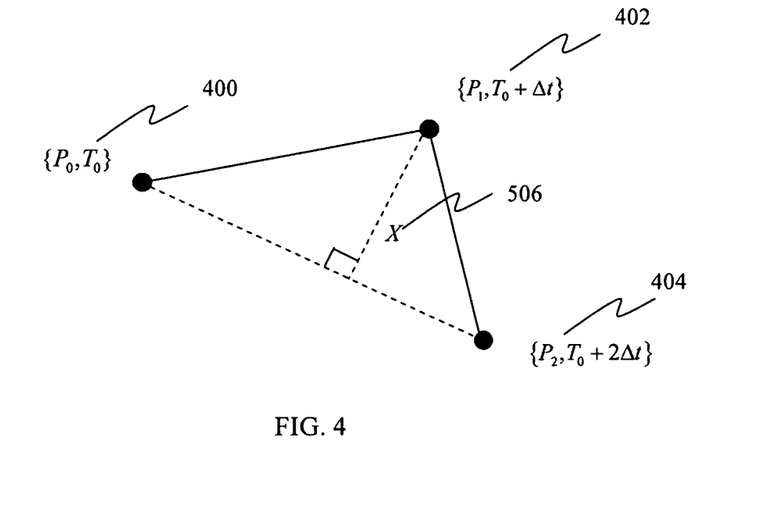
FIG. 4 is a diagram showing an example of three mouse coordinates recorded by an agent at regular intervals of time.

In step 308, the agent counts the number of recorded interaction events and checks whether the number reaches a threshold. In some embodiments, three mouse movement events are collected before data is transmitted to a remote system. FIG. 4 illustrates an example of three recorded mouse coordinates. Coordinate 400 $\{P_0, T_0\}$ is the first mouse coordinate recorded at time $T_0$, where $P_0$ is the coordinate on a display screen, which typically consists of an x-axis value and a y-axis value. Similarly, coordinate 402 $\{P_1, T_0+\Delta t\}$ is the second mouse coordinate recorded at time $T_0+\Delta t$, where $\Delta t$ is a time interval, and coordinate 404 $\{P_2, T_0+2\Delta t\}$ is the third mouse coordinate recorded at time $T_0+2\Delta t$. In some embodiments, the time interval $\Delta t$ may be set as a fixed value such as 128 milliseconds or 256 milliseconds. In other embodiments, $\Delta t$ may be set as an arbitrary value by the agent. The three mouse coordinates may form a triangle as illustrated in FIG. 4. In some embodiments, the height of the triangle 406 X may be derived for multiple mouse coordinate sets, and used as a signature to detect bots. When the interaction events are generated by bots, the distribution of 406 X may be different from the distribution when the interaction events are generated by human. In other embodiments, other values may be derived and used as signatures to detect bots. For example, the distribution of the area of the triangle formed by the three mouse coordinates in FIG. 4 may be used as a signature to detect bots. In other embodiments, various bot types may be profiled by using a variety of signature values. The various types of profiles may be used to detect the various types of bots.

If the number of recorded interaction events exceeds the threshold value in step 308, the agent encodes and sends the recorded data to a bot detection server in step 310. In some embodiments, the agent encodes the recorded data in one of the parameters of an HTTP request sent to the bot detection server. In some embodiments, the bot detection server is a process running on a server system. In other embodiments, the bot detection server may be a process running on the client system. In some embodiments, the recorded data is encoded as a file name and embedded in an HTTP request sent to the bot detection server. The HTTP request may result in an error message logged in a server log on the bot detection server because the HTTP request essentially asks for a file that does not exist. In such an implementation, the HTTP server of the server may log the "404—File Not Found" error in association with the request, and possibly, an IP address and/or a browser cookie along with the encoded data appended to the request. As one skilled in the art will appreciate, in the above-described embodiment, if the agent does not detect any interaction events, the logs of the server will not contain such error data.

In some other embodiments, the recorded data received by the server may be validated and analyzed by the server. The validation and analysis may occur in real time, i.e., may occur as soon as the data is received by the server, or offline, i.e., may occur when analyzing the server log. The server therefore may ultimately determine whether the events are indeed generated by a human interacting with an application running on the client system. In other embodiments, however, an agent may make a determination on the client system whether the interaction events are a result of human interaction with the client system. The agent may make such determinations either in real time or periodically. The server may periodically poll the agent and fetch the determinations made by the agent on the client system.

In some embodiments, the server may adjust a communication policy with the client system. For example, if the bot detection server determines that one or more bots are running on a client system, the server may ignore clicks on the advertisements from the client system or discontinue serving advertisements to the client system.

In some embodiments, after sending the recorded data to the server, the agent terminates. In other embodiments, the agent may go back to step 302 and wait for another period of time before waking up to check for interaction events.

Figure 5:
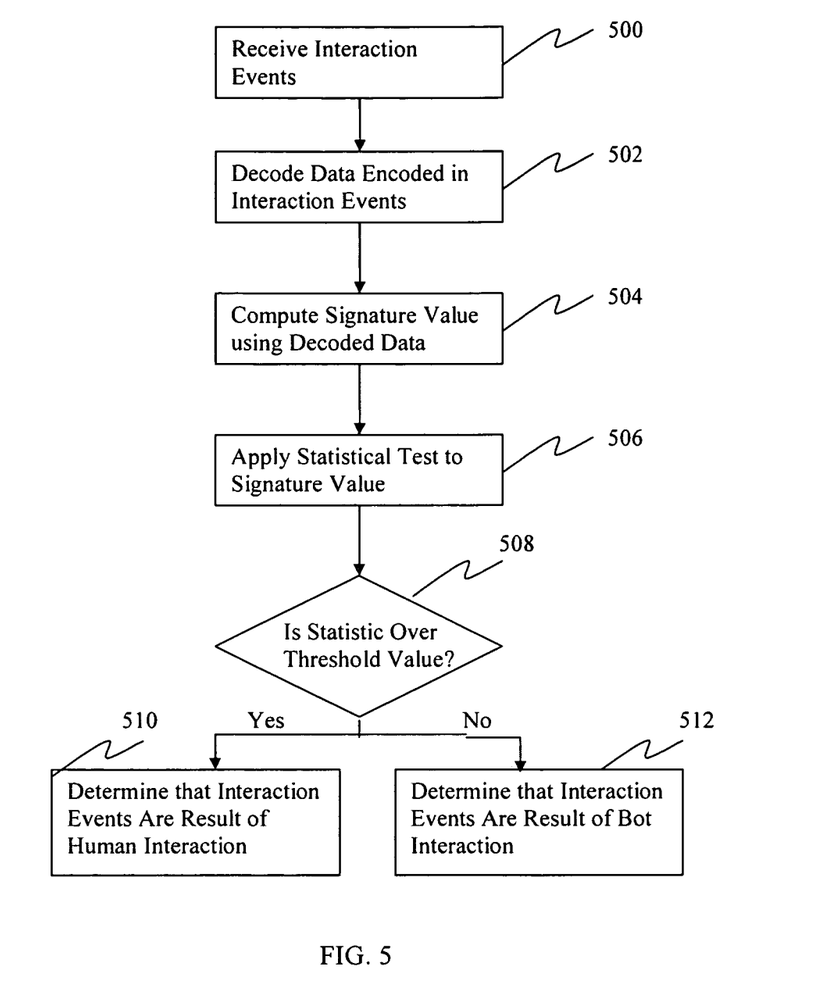
FIG. 5 is a diagram showing a flowchart of an example process used for validating whether one or more interaction events are a result of human interaction with an input/out devices attached to a client system.

FIG. 5 illustrates an example process used for validating whether a session related interaction event, such as clicking on a link in a web page, is a result of human interaction with an input device attached to a client system, which process may be used by an embodiment of the present invention. In the first step 500, the process receives one or more interaction events recorded by an agent. In one embodiment, the interaction events entail three mouse coordinates recorded at regular intervals of time as illustrated in FIG. 4. The values of the three positional mouse coordinates may be encoded in the interaction event data recorded by the agent. In some embodiments, the agent monitors the coordinates and computes a signature value based on the coordinates and transmits the signature value to the server. In step 502, the process decodes the data encoded in the interaction events such as the three mouse ordinates 400 $\{P_0, T_0\}$, 402 $\{P_1, T_0+\Delta t\}$, and 404 $\{P_2, T_0+2\Delta t\}$ as illustrated in FIG. 4. In step 504, a signature value is derived using the decoded data. In one embodiment, the signature value is the height of a triangle formed by three mouse coordinates as illustrated by 406 X in FIG. 4. Once the signature value is derived, the process runs a statistical test in step 506 to test the hypothesis that the interaction events are a result of human interaction with an input device attached to the client system. In one embodiment, a likelihood ratio test is used and the test is performed on the height of the triangle formed by the three mouse coordinates as illustrated by 406 X in FIG. 4. When the mouse movements are generated by bots, the distribution of 406 X may be different from that resulting from mouse movements generated by humans. Let $H_H$ represent the hypothesis that the given interaction events are generated by a human, and $H_B$ be the hypothesis that they are generated by a bot. Let $f_H(X|H_H)$ and $f_B(X|H_B)$ be the probability distribution function of the two chosen distributions, where f is the normal distribution given by $$f(x) = \frac{1}{\sigma\sqrt{2\pi}} e^{-(x-\mu)^2/2\sigma^2}$$

where $\mu=\mu_H$, $\sigma=\sigma_H$ for $f_H$ and $\mu=\mu_B$, $\sigma=\sigma_B$ for $f_B$. The likelihood ratio statistic $\lambda(X)$ is determined by $$\lambda(x) = \frac{f_H}{f_B}.$$

In step 508, the process checks whether the computed statistic $\lambda(X)$ is over a threshold value $\theta$. If $\lambda(X)$ is greater than $\theta$, the process may determine that the interaction events are indeed generated by a human in step 510. Otherwise, the process may determine that the interaction events are generated by a bot in step 512.

The threshold value $\theta$ may be determined by historical data, i.e., by analyzing distributions of the height of the triangle when it is known that the mouse coordinates are generated by bots and by human. For example, bot and human interaction models, i.e., probability distribution function for 406 X in FIG. 4 may be a heuristic process of developing the profiles against which the agent-gathered data is compared. There may be several profiles for different types of bots. A normal distribution may be assumed for the distribution of X and histograms of X may be obtained over a period of time. When X is from a known bot, either through simulation or through an identification process such as a human editorial review, a probability distribution function may be established for X. Multiple Xs may be analyzed to develop a score that may be used as a signature to detect bots. Other attributes of the triangle geometry may also be analyzed in combination to establish a signature. For example, a weighted sum of attributes of the triangle may be used as a signature for bots.

Figure 6:
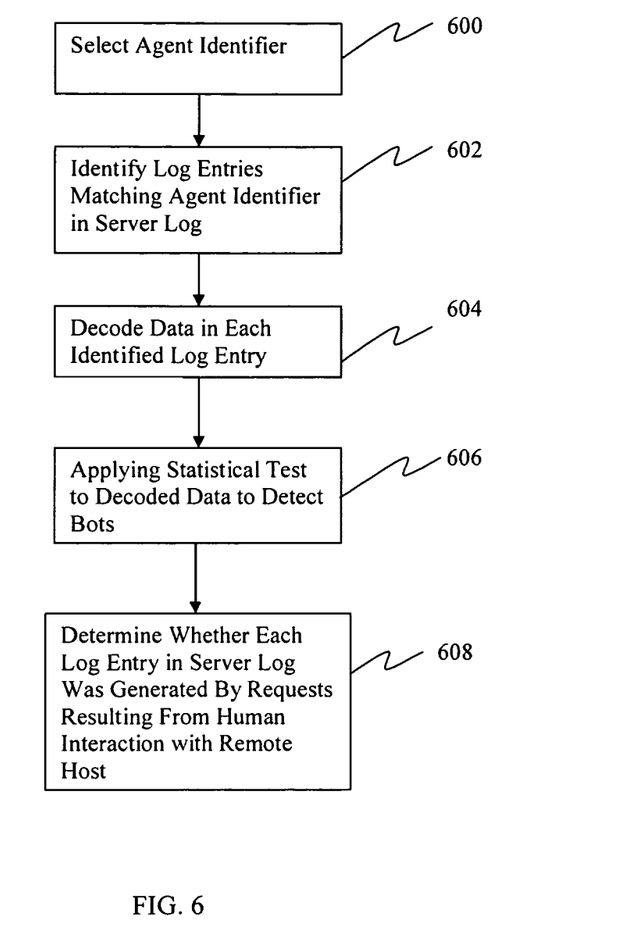
FIG. 6 is a diagram showing a flowchart of an example process used for identifying and validating one or more interaction events in a server log.

FIG. 6 illustrates an example process to identify requests generated by bots in a server log, which process may be used by an embodiment of the present invention. In the first step 600, the process selects an identifier for an agent wherein the identifier comprises one or more bytes. An agent is a program written in a programming or scripting language such as Java, JavaScript or ActionScript. An agent runs on a client system and communicates with the server. In the server log, log entries may be generated by requests from one or more agents on one or more client systems. In order to identify requests from various agents, predefined identifiers may be used for each agent. Each agent is associated with an identifier comprising one or more bytes. In one embodiment, the identifier for an agent may be a predefined name of a file that does not exist on the server. When the agent on a client system communicates with the server, it sends an HTTP request to the server to fetch the file with the predefined name. When the server receives the HTTP request, it creates a server log entry indicating that an error occurred for the request since the file with the predefined name does not exist on the server. In the same server log entry, the predefined file name and other parameters in the HTTP request are also logged. In some embodiments, the parameters may be encrypted with XOR using a shared secret which may be decoded at analysis time. Other encryption protocols may be used in other embodiments.

In another embodiment, the identifier for an agent may be encoded in one of the parameters of an HTTP request. Typically, a server log entry for an HTTP request includes one or more bytes comprising encoded values of an IP address from which the request is sent, a request end time, a request duration, a number of bytes sent, an HTTP host, and HTTP method, a response status, one or more cookies, a user-agent, a referrer, one or more advertisement IDs, and one or more user-defined values. The identifier of an agent may be encoded in the user-defined values in the request and is logged in the server log. Data related to the interaction event may also be encoded in the user-defined values in the request. The identifier may be an arbitrary value that serves as a unique identifier for the agent to address situations where multiple instances of the agent may be running on the same client host (for example, when multiple browser window are open).

After an identifier of an agent is selected in step 600, the embodiment in step 602 identifies the log entries in the server log which contain the selected agent identifier. For each log entry that contains the selected agent identifier, the embodiment decodes the values encoded in the log entry in step 604. The decoded values may entail an IP address, a user-agent, an HTTP cookie, and data associated with the interaction events detected by the selected agent.

In step 606, the embodiment applies a statistical test to the decoded data to determine whether the identified log entries are generated by bots running on the client system. An example process is illustrated in FIG. 5, described above.

In step 608, the embodiment determines whether one or more log entries in the server log was generated by requests resulting from human interaction on the client system. The embodiment may make such determinations by identifying user sessions in the server log or by identifying web page views.

In one embodiment, one or more user sessions may be identified based on the identified IP addresses, the user-agents, or the HTTP cookies. HTTP cookies are used by Web servers to differentiate users and to maintain user session data related to the same user during multiple HTTP requests. If one or more user sessions can be identified from the server log, the embodiment may identify a first group of user sessions in which HTTP requests were received from the agent with the selected identifier, and a second group of user sessions in which no such requests were received. Since the agent on the client system typically sends an HTTP request when interaction events are detected on the client system, lack of HTTP requests in a user session typically indicates that the HTTP requests in the user session are generated by bots. Therefore, the embodiment may determine that each log entry from any of the second group of user sessions in which no HTTP requests were received from the selected agent is generated by one or more bots. On the other hand, the embodiment may apply a statistical test to the interaction event data encoded in each log entry from any of the first group of user sessions to determine whether the interaction events are a result of human interaction with the client system. If the embodiment determines that the interaction events are indeed generated by a human viewer, the embodiment may validate the corresponding user sessions. Otherwise, the embodiment may determine that bots may have been used in the corresponding user sessions.

In another embodiment, a web page may be identified in the server log based on the HTTP cookies. The embodiment may identify whether there are any interaction events logged in the server log that are sufficiently close in time when the web page was accessed. For the identified interaction events, the embodiment may apply a statistical test to validate whether the interaction events are generated by human interaction with the client system. As a result, the embodiment may infer whether actions taken relative to the web page were generated by bots based on the existence of any validated interaction events in close proximity of the time when the web page was accessed.

The present invention has been explained with reference to specific embodiments. For example, while embodiments of the present invention have been described with reference to specific hardware and software components, those skilled in the art will appreciate that different combinations of hardware and/or software components may also be used, and that particular operations described as being implemented in hardware might also be implemented in software or vice versa. For example, Asynchronous Javascript and XML (Ajax) can be used to transmit detected interaction data to the server. In yet other implementations, the agent may be configured to embed the interaction data in browser cookies appended to HTTP requests transmitted by browsers to a remote server. Other embodiments will be evident to those of ordinary skill in the art. It is therefore not intended that the present invention be limited, except as indicated by the appended claims.

What is claimed is:
1. A method comprising:
transmitting a web page to a remote host, the web page including an agent operative to register as a listener for mouse movement events on the remote host;

receiving interaction event data from the agent, wherein the interaction event data comprises positional coordinate data detected by the agent as the listener for mouse movement events;

extracting one or more positional movement parameter values from the interaction event data, wherein the one or more positional movement parameter values comprise at least three mouse coordinates resulting from the mouse movement events; and determining whether the interaction event data associated with the mouse movement events resulted from human interaction or from an automated process executing on the remote host, comprising:

deriving a signature value using at least three mouse coordinates, the signature value indicating a characteristic of the mouse movement events;

computing a statistical value by applying the signature value to a statistical test, the statistical test being a likelihood ratio test and the statistical value being based on an application of the likelihood ratio test with respect to the signature value;

comparing the statistical value with a threshold value associated with the characteristic of the mouse movement events indicated by the signature value, the threshold value being predetermined for the characteristic of the mouse movement events that distinguishes human interactions from automated processes with respect to the characteristic of mouse movement events.

2. The method of claim 1 wherein the web page comprises an activatable interface element, and wherein the method further comprises receiving a request from the remote host caused by activation of the activatable interface element; and validating the request from the remote host based on whether the interaction event data associated with the mouse movement events resulted from human interaction or from an automated process executing on the remote host.

3. The method of claim 1 wherein one of the one or more positional parameter values comprises a value of an attribute derived from analysis of two or more positional coordinates of the positional coordinate data detected by the agent.

4. The method of claim 1 further comprising correlating the interaction event data to one or more events of a session between the remote host and a server, and validating the one or more events based on the determination whether the interaction event data associated with the mouse movement events resulted from human interaction or from an automated process executing on the remote host.

5. A method comprising receiving interaction event data from an agent executing on a remote host, wherein the interaction event data characterizes positional movement of an input device operably associated with the remote host;

extracting one or more positional movement parameter values from the interaction event data, wherein the one or more positional movement parameter values comprise at least three mouse coordinates resulting from the mouse movement events; and determining whether the interaction with the input device resulted from human interaction or from an automated process executing on the remote host, comprising:

deriving a signature value using the at least three mouse coordinates, the signature value indicating a characteristic of the positional movement of the input device;

computing a statistical value by applying the signature value to a statistical test, the statistical test being a likelihood ratio test and the statistical value being based on an application of the likelihood ratio test with respect to the signature value; and comparing the statistical value with a threshold value associated with the characteristic of the positional movement of the input device indicated by the signature value, the threshold value being predetermined for the characteristic of the positional movement of the input device that distinguishes human interactions from automated processes with respect to the characteristic of the positional movement of the input device.

6. The method of claim 5 further comprising correlating the interaction event data to one or more events of a session between the remote host and a server, and validating the one or more events based on the determination whether the interaction with the input device resulted from human interaction or from an automated process executing on the remote host.

7. The method of claim 5 wherein the input device is a mouse device and the one or more positional parameter values comprise one or more positional coordinates of the mouse device attached to the remote host.

8. The method of claim 7 wherein the agent records the positional coordinates at regular intervals of time.

9. The method of claim 5 wherein the determining step comprises applying the likelihood ratio test to test a hypothesis that the interaction events are a result of human interaction with the input device or a result of an automated process executing on the remote host; and deciding, based on the value of the computed statistical value, whether to accept or reject the hypothesis.

10. The method of claim 9 wherein the computing step comprises calculating, using the signature value, a first probability density function value based on a known distribution when the interaction events are a result of human interaction with the input device;

calculating, using the signature value, a second probability density function value based on a known distribution when the interaction events are a result of non-human interaction with the input device; and calculating a likelihood ratio statistic using the first and the second probability density function values to compute the statistical value.

11. The method of claim 10 wherein the statistical value is compared with the threshold value to determine whether the interaction with the input device resulted from human interaction.

12. The method of claim 11 wherein the threshold value is determined by historical distribution data of the signature value.

13. The method of claim 1, wherein the at least three mouse coordinates form a triangle, and the signature value is a height of the triangle.

14. The method of claim 1, wherein the at least three mouse coordinates form a triangle, and the signature value is an area of the triangle.

15. A method comprising:

transmitting, by one or more first computing devices to a second computing device, an agent operative to detect movements of a mouse associated with the second computing device;

receiving, at the one or more first computing device and from the agent residing on the second computing device, mouse movement data indicating the movements of the mouse associated with the second computing device; and determining, by the one or more first computing device, whether the movements of the mouse resulted from human interactions with the mouse or from an automated process executing on the second computing device, comprising:

extracting, from the mouse movement data, three or more mouse coordinates;

determining a signature value using the three or more mouse coordinates, wherein the signature value indicates a characteristic of the movements of the mouse;

computing a statistical value by applying the signature value to a statistical test, the statistical test being a likelihood ratio test and the statistical value being based on an application of the likelihood ratio test with respect to the signature value; and comparing the statistical value with a threshold value associated with the characteristic of the movements of the mouse indicated by the signature value, the threshold value being predetermined for the characteristic of the movements of the mouse that distinguishes human interactions with the mouse from automated processes with respect to the characteristic of the movements of the mouse.

16. The method of claim 15, wherein the three or more coordinates form a triangle, and the signature value is a height of the triangle.

17. The method of claim 15, wherein the three or more coordinates form a triangle, the signature value is an area of the triangle.

* * * * *